US005310721A

United States Patent [19]
Lo

[11] Patent Number: 5,310,721
[45] Date of Patent: May 10, 1994

[54] PROCESS FOR THE PREPARATION OF MICROCAPSULES USING A SALT OF A PARTIAL ESTER OF A STYRENE-MALEIC ANHYDRIDE COPOLYMER

[75] Inventor: Chien-Cho Lo, Greensboro, N.C.

[73] Assignee: Ciba-Geigy Corporation, Ardsley, N.Y.

[21] Appl. No.: 52,510

[22] Filed: Apr. 27, 1993

Related U.S. Application Data

[63] Continuation-in-part of Ser. No. 818,029, Jan. 3, 1992, abandoned.

[51] Int. Cl.$^5$ .............................. A01N 25/28
[52] U.S. Cl. ..................... 504/116; 424/408; 514/772.3; 71/DIG. 1
[58] Field of Search ............. 504/116, 341; 71/DIG. 1; 424/408; 514/772.3

[56] References Cited

U.S. PATENT DOCUMENTS

| | | | |
|---|---|---|---|
| 3,577,515 | 5/1971 | Vandegaer | 424/32 |
| 4,233,178 | 11/1980 | Fuchigami | 252/316 |
| 4,280,833 | 7/1981 | Beestman | 71/100 |
| 4,417,916 | 11/1983 | Beestman | 71/93 |
| 4,533,599 | 8/1985 | Okumura | 428/402 |
| 4,563,212 | 1/1986 | Becher | 71/118 |
| 4,601,863 | 7/1986 | Shioi et al. | 71/DIG. 1 |
| 4,630,079 | 12/1986 | Kosaka | 346/207 |
| 4,640,709 | 2/1987 | Beestman | 71/DIG. 1 |
| 4,681,806 | 7/1987 | Matkan et al. | 504/342 |
| 4,876,290 | 10/1989 | Vivant | 521/76 |
| 4,938,797 | 7/1990 | Hässlin et al. | 504/116 |
| 5,091,280 | 2/1992 | Yamaguchi | 430/138 |

FOREIGN PATENT DOCUMENTS 0278878 8/1988 France.

OTHER PUBLICATIONS

JPA-60216839, Mitsubishi Seiki/Abstract, 1985.
SMA Resins General Bulletin Atochem N. America In (C1989).
SMA Resins as Dispersants Agricultural Appl. Atochem In (C1987).
SMA 1440H Resins as a Pigment Dispersant Acrylic Latex Semi Gloss Paint, Oct. 1990.
SMA 1440H Dispersed Semi-Gloss Latex Paint Formulation for Universal Tinting Systems, Oct. 1990.

*Primary Examiner*—Richard L. Raymond
*Assistant Examiner*—S. Mark Clardy
*Attorney, Agent, or Firm*—Kevin T. Mansfield; Edward McC. Roberts

[57] ABSTRACT

This invention relates to a process for encapsulation and particularly for the preparation of microcapsules having a capsule wall of a solid polymeric substance enclosing a water-immiscible material, which process comprises preparing a solution of a first reactive component required to form the capsule wall in the water-immiscible material, then dispersing the mixture in an aqueous medium containing a surfactant which is a salt of a partial ester of a styrene-maleic anhydride copolymer, to form an oil-in-water emulsion, and subsequently adding a second reactive component required to form the capsule wall which is complementary to the first one and reacts with it under the mixing conditions, whereby a solid polymeric wall is formed about the dispersed water-immiscible material. The resulting stable aqueous suspension of microcapsules can either be used directly or after dilution with water, or the microcapsules can be separated from the aqueous phase.

14 Claims, No Drawings

PROCESS FOR THE PREPARATION OF MICROCAPSULES USING A SALT OF A PARTIAL ESTER OF A STYRENE-MALEIC ANHYDRIDE COPOLYMER

This application is a continuation-in-part of application Ser. No. 07/818,029, Jan. 3, 1992 now abandoned.

BACKGROUND OF THE INVENTION

The present invention relates to a process for the preparation of microcapsules having a capsule wall of a polymeric substance enclosing a water-immiscible material, by interfacial polymerization of an aqueous dispersion of a first polymer-forming substance dissolved in a water-immiscible material with a second polymer-forming substance which reacts with the first one under the mixing conditions, to form a stable aqueous suspension of microcapsules of the water-immiscible material. The invention also relates to a composition comprising said microcapsules and the use of said microcapsules.

It is known per se to prepare microcapsules by carrying out an interfacial polycondensation reaction in a liquid, with one of the reactive components required to form the capsule wall being dissolved in the disperse phase and the other being dissolved in the continuous phase. Such a process is disclosed for example in U.S. Pat. No. 3,577,515. This process is carried out by initially dispersing a solution of the first reactive component required to form the capsule wall and an immiscible material in a continuous phase with high shear and then adding a solution of a second complementary reactive component dissolved in the medium containing the continuous phase to it with mixing. In the process of U.S. Pat. No. 3,577,515, it is recommended to use nonionic protective colloids such as polyvinyl alcohol, gelatin and methyl cellulose for the dispersion of a water-immiscible organic phase in a continuous aqueous phase. A variety of wall-forming components are disclosed.

One drawback of this process is that it is incapable of encapsulating concentrated amounts of material, such as 45% by weight or more, because the microcapsules tend to agglomerate into large unusable masses.

Several U.S. patents such as U.S. Pat. Nos. 4,280,833, 4,640,709 and 4,938,797 disclose processes for microencapsulation via an interfacial polycondensation reaction whereby concentrated amounts of water-immiscible materials, such as 45% by weight or more, can be encapsulated within a polymeric shell wall, with the finished microcapsules forming a stable suspension in an aqueous medium. The ability to obtain high concentrations of microcapsules is taught to critically depend on the use of a specific type of surfactant or a combination of surfactants, for example, a salt of a lignin sulfonate in U.S. Pat. No. 4,280,833, an alkylated polyvinyl pyrrolidone polymer in U.S. Pat. No. 4,640,709 and a combination of a formaldehyde condensate of a naphthalene sulfonate with ethylene oxide/propylene oxide/ethylene oxide block polymers in U.S. Pat. No. 4,938,797.

Microcapsules prepared by interfacial polycondensation can advantageously contain materials which have a variety of uses, such as for dyes, inks, color formers, pharmaceuticals, cosmetics, flavoring materials, agricultural chemicals and the like. Any liquid, oil, low melting solid or solvent-soluble material into which a first wall-forming material can be dissolved and which is non-reactive with said wall-forming material may be encapsulated with this technique. Once encapsulated, the liquid or other form is preserved until it is released by some means which breaks, crushes, melts, dissolves, or otherwise removes the capsule skin or until release by diffusion is effected under suitable conditions.

The process of the present invention is particularly suitable for the production of microcapsules of very small capsule size which are suspended in an aqueous medium and which contain agricultural chemicals such as pesticides and herbicides.

Aqueous suspensions of pesticide and herbicide microcapsules are particularly useful in controlled release pesticide and herbicidal formulations because they can be diluted with water or liquid fertilizer and sprayed using conventional equipment, thereby producing uniform field coverage of the agricultural chemical. Additives such as film forming agents can be added directly to the finished formulation to improve the adhesion of microcapsules to foliage. In some instances, reduced toxicity and extended activity of encapsulated herbicides and pesticides have been noted.

Most conventional oil-in-water surfactants fail to produce emulsions which are suitable for microencapsulation via interfacial polymerization. More importantly, they fail to maintain a stable suspension of microcapsules during the critical wall-forming step, particularly when high concentrations of water-immiscible materials are involved. This results in coalescence of the partially formed capsules into larger agglomerates which cannot be redispersed, or even solidification of the entire nonaqueous phase when the second reactive component is stirred into the oil-in-water emulsion. The critical factor in achieving stable, high concentrations of microencapsulated materials is therefore the selection and use of a special type of surfactant or adjuvant which is able to both produce a stable oil-in-water emulsion and, more importantly, to stabilize the subsequent suspension of capsules during the wall-formation step so that coalescence to large unusable agglomerates is avoided.

It has now been discovered that by using salts of partial esters of styrene-maleic anhydride copolymers in the process of microencapsulation via interfacial polymerization, it is possible to obtain highly concentrated, stable microcapsule suspensions. The the present invention thus provides a new and improved method of encapsulation via interfacial polymerization which provides a rapid and effective way to obtain high concentrations of water-immiscible materials in the form of an aqueous microcapsule suspension.

Generally, the water-immiscible material can be effectively encapsulated at concentrations up to about 45% by weight or higher without difficulty. Once the water-immiscible material, for example, a pesticide or herbicide, is encapsulated, the system becomes a solid-in-liquid suspension which can be directly combined with other water-based materials, for example, liquid fertilizers. Or it can be diluted with water and sprayed by a conventional applicator.

DETAILED DESCRIPTION OF THE INVENTION

The process of this invention for the preparation of microcapsules having a capsule wall of a solid polymeric substance enclosing a water-immiscible material comprises preparing a solution of a first component required to form the capsule wall in the water-immiscible material, then uniformly dispersing this solution in an aqueous medium which contains, in an effective amount to form an oil-in-water emulsion, a surfactant which is a salt of partial ester of a styrene-maleic anhydride copolymer, and subsequently adding a second reactive component required to form the capsule wall which is complimentary to the first one and reacts with it under the mixing conditions. The mixture is then stirred until the wall-forming components have fully reacted with each other, whereby a solid polymeric wall is formed about the water-immiscible material to be encapsulated.

The critical feature of the present invention lies in the use of a specifically selected surfactant, which is a salt of a partial ester of a styrene-maleic anhydride copolymer.

Suitable styrene-maleic anhydride copolymers are commercially available from Atochem North America, Inc., Suite 300, 5 Great Valley Parkway, Malvern, Pa., USA, under the trade name SMA ® Resins. They are described by the manufacturer as low molecular weight copolymers formed by reacting maleic anhydride with 1-3 moles of styrene and having on average 6-8 repeating units. Said resins are both the anhydride and and partial ester forms. Alcohols will react with the anhydride form of the SMA Resins to form esters by ring opening of the anhydride groups. The ester forms are readily soluble in aqueous ammonia and may be converted to suitable ammonium salts by simply heating and stirring. One such salt, SMA 1440H, which is an ammonium salt of a partial ester of a 1:1 styrene-maleic anhydride copolymer, is also commercially available from Atochem and is a particularly preferred aspect of this invention. According to the manufacturer, the degree of esterification of their commercial partial esters is 30 to 50%.

Other suitable salts are, for example alkali metal salts such as lithium, sodium and potassium salts, alkaline earth salts such as calcium and magnesium salts and salts of quaternary ammonium hydroxides such as tetramethylammonium hydroxide. Said salts can be obtained directly by heating the ester of an SMA Resin with an aqueous solution of the appropriate inorganic or organic base instead of an aqueous ammonia solution, or indirectly by cation exchange. Mixtures may offer advantages with regard to solubility and performance.

The number average molecular weight of the salt of a partial ester of a styrene-maleic anhydride copolymer is in the range of 1000 to 6000, preferably 1000 to 4000, and more preferably 1000 to 3000. The number average molecular weights can be determined by known methods, for example by the gel permeation method.

The amount of the salt of partial ester of styrene-maleic anhydride copolymer to employ ranges from about 0.5 percent to about 20 percent, preferably from about 1 percent to about 8 percent, and most preferably from 1 to 5 percent relative to the weight of the water-immiscible material to be encapsulated.

The process of the present invention is particularly suitable for the production of microcapsules which are of very small and uniform capsule size and which are suspended in an aqueous medium. The microcapsules preferably contain agricultural chemicals.

Within the scope of this invention, suitable agricultural chemicals are those which are insoluble in water, are liquid at room temperature or have a melting point of less than about 60° C., or are soluble in a water-immiscible organic solvent, and are able to dissolve, but are non-reactive to, a first reactive wall-forming component.

In the practice of the process of this invention, the water-immiscible material should be in the liquid state. For normally solid materials this can be accomplished either by carrying out the interfacial condensation at a temperature above the melting point of the water-immiscible material or by adding amount of an agrochemically suitable water-immiscible solvent.

Suitable water-immiscible solvents in which the agricultural chemicals may be dissolved and which are not reactive toward the components used to form the capsule walls include hydrocarbons such as cyclohexane, benzene, toluene, xylene, mineral oil, kerosene and mixtures of mono- and polyalkylated aromatics such as those commercially available under the registered trademarks SHELLSOL (Shell Chemical) and AROMATIC 200 (Exxon). Also suitable are water-immiscible ketones such as cyclohexanone, esters of long chains acids such as KEMESTER 9014 (tetradecanoic acid methyl ester, available from Witco) as well as halogenated hydrocarbons such as methylene chloride, chloroform, chlorobenzene and o-dichlorobenzene.

In the process of this invention, it is possible to encapsulate a very wide range of agrochemicals, for example herbicides, plant growth regulators, insecticides, acaricides, fungicides, nematicides, safeners and actoparasiticides.

With respect to their chemical constitution, these substances may belong to a very wide range of compound classes. Examples of compound classes to which the agricultural chemicals which can be encapsulated in the process of this invention may belong include dinitroanilines, acylalanines, triazine and triazole derivatives, carbamates, phosphoric acid esters, pyrethroids, benzilic acid esters, polycyclic halogenated hydrocarbons, formamidines and dihydro-1,3-thiazol-2-ylidene anilines. Examples of suitable individual compounds of the above mentioned compound classes are listed hereinafter. Where known, the common name is used to designate the individual compounds (q.v. the Pesticide Manual, 7th edition, 1983, British Crop Protection Council).

s-Triazines

Atrazine, propazine, terbutylazine, ametryn, aziprotryne, desmetryn, dipropetryn, prometryn, terbutryn, secbumeton and terbumeton.

Ureas

Chlorobromuron, chloroxuron, chlorotoluron, fluometuron, metobromuron and thiazafluron.

Haloacetanilides

Dimethacor, metolachlor, pretilachlor, 2-chloro-N-(1-methyl-2-methoxyethyl)-acet-2,4-xylidide, alachlor, butachlor, diethatyl-ethyl and propachlor.

Diphenyl Ether Derivatives

Bifenox, diclofopmethyl, 4-(4-pentyn-1-yloxy)diphenyl ester and cis,trans-(±)-2-ethyl-5-(4-phenoxyphenoxymethyl)-1,3-dioxolane.

Phenoxyphenylpropionic acid derivatives-

Fluazifop.

Dinitroanilines

Butralin, ethalfluralin, fluchloralin, isopropalin, pendimethalin, profluralin and trifluralin.

Acylalanines

Fluralaxyl, metalaxyl, benzoylprop-ethyl and flamprop-methyl.

Triazole Derivatives

Etaconazole, propiconazole, 1-[2-(2,4-dichlorophenyl)-pent-1-yl]-1H, 1,2,4-triazole and triadimefon.

Carbamates

Dioxacarb, furathiocarb, aldicarb, benomyl, 2-sec-butylphenylmethylcarbamate, etiofencarb, isoprocarb, propoxur, carbetamide, butylate, di-allate, EPTC, molinate, thiobencarb, triallate and vernolate.

Phosphoric Acid Esters

Piperophos, anilofos, butamifos, azamethiphos, chlorfenvinphos, dichlorvos, diazinon, methidathion; azinphos-ethyl, azinphos-methyl, chlorpyrifos, chlorthiofos, crotoxyphos, cyanophos, demeton, dialifors, dimethoate, disulfoton, etrimfos, famphur, flusulfothion, fluthion, fonofos, formothion, heptenophos, isazophos, isofenphos, isoxathion, malathion, mephospholan, mevinphos, naled, oxydemeton-methyl, oxydeprofos, parathion, phoxim, pyrimiphos-methyl, profenofos, propaphos, propetamphos, protiophos, quinalphos, sulprofos, phemephos, terbufos, triazophos, trichloronate, fenamiphos, S-benzyl-O,O-diisopropylphosphorothioate, edifenphos and pyrazophos.

Pyrethroids

Allethrin, bioallethrin, bioresmethrin, cyhalotrin, cypermethrin, deltamethrin, fenpropathrin, fenvalerate, flucythrinate, fluvalinate, permethrin, pyrethrin, resmethrin, tetramethrin and tralomethrin.

Benzilic Acid Esters

Bromopropylate, chlorbenzylate and chlorpropylate.

Polycyclic Halogenated Hydrocarbons.

Aldrin and endosulfan.

Formamidines

Chlordimeform, dihydro-1,3-thiazol-2-ylidene-anilines and n-(2,3-dihydro-3-methyl-1,3-thiazol-2-ylidene)-2,4-xilidine.

Miscellaneous

Methopren, kinopren, flupropimorph, tridemorph, bromoxynil, crimidine, bupyrimate, sethoxydim, chlorphenprop-methyl, carboxin, buthiobate, amithraz, dicofol, oxadiazon, prochloraz, propargite, dicamba, camphechlor and chlorfenson.

Particularly preferred agricultural chemicals are metolachlor, profenofos, isazofos, propiconazole, diazinon and cis,trans-($\pm$)-2-ethyl-5-(4-phenoxy-phenoxymethyl)-1,3-dioxolane.

Within the scope of this invention, the amount of the agricultural chemical which can be encapsulated is usually at least 100 g of microcapsules per liter or 10% by weight and can be up to about 700 g of microcapsules per liter or 70% by weight. A conventional 4 lbs./gallon concentration or about 45% by weight can generally be obtained without difficulty. In practical operation, as will be realized by those skilled in the art, the resultant suspension becomes very thick if an extremely high concentration of agricultural chemicals is encapsulated.

Furthermore, the agricultural chemicals to be encapsulated need not to be limited to only one type, but may be a combination of two or more various types, for example, two herbicides or a herbicide with an insecticide or a safener.

It is known per se, for example from U.S. Pat. Nos. 3,577,515, 4,563,212 and 4,640,709, that processes for microencapsulation via an interfacial polycondensation reaction between complementary reactants are adaptable to a variety of polycondensation reactions. That is to say, by choosing appropriate pairs of reactants which are capable of undergoing interfacial condensation from their respective carrier liquids to form a solid polymer at the liquid interface, one is able to form capsule skins of various polymers. U.S. Pat. No. 4,640,709 discloses and exemplifies, from column 6 line 12 to column 13, line 22, various suitable complementary reactants and their use to produce capsule walls in the form of polyamides, polysulfonamides, polyesters, polycarbonates, polyurethanes, polyureas and mixtures thereof. Said disclosure is incorporated by reference. By using the wall-forming reactants and procedures disclosed therein, but replacing the alkylated polyvinyl pyrrolidone emulsifiers employed therein by an appropriate amount of a salt of a partial ester of a styrene-maleic anhydride copolymer according to the present invention, it is possible to obtain, with only routine experimentation, highly concentrated, stable microcapsule suspensions of the most diverse types of water-insoluble materials encapsulated within polyamide, polysulfonamide, polyester, polycarbonate, polyurethane or polyurea walls.

The preferred encapsulated materials are agricultural compounds, and for said materials the walls are preferably formed by reacting polyisocyanates, dissolved in the water-immiscible material, with aqueous solutions of diamines or polyamines to form polyureas.

Within the scope of this invention, polyisocyanates will be generally understood as meaning those compounds that contain two or more isocyanate groups in the molecule. Preferred isocyanates are di- and triisocyanates whose isocyanate groups may be linked to an aliphatic or aromatic moiety. Examples of suitable aliphatic diisocyanates include tetramethylene diisocyanate, pentamethylene diisocyanate and hexamethylene diisocyanate. Suitable aromatic isocyanates include toluene diisocyanate (TDI: a mixture of the 2,4- and 2,6-isomers), diphenylmethene-4,4'-diisocyanate (MDI: DESMODUR ® VL, Mobay Corp., Pittsburgh), polymethylene polyphenyl isocyanate (MONDUR ® MR, Mobay Corp., Pittsburgh), PAPI ® and PAPI ® 135 (Upjohn Co.), 2,4,4'-diphenyl ether triisocyanate, 3,3'-dimethyl-4,4'-diphenyl diisocyanate, 3,3'-dimethoxy-4,4'-diphenyl diisocyanate, 1,5-naphthylene diisocyanate and 4,4',4"-triphenylmethane triisocyanate. A further suitable diisocyanate is isophorone diisocyanate.

Also suitable are adducts of diisocyanates with polyhydric alcohols such as ethylene glycol, glycerol and trmethylolpropane, obtained by addition, per mole of polyhydric alcohol, of a number of moles of diisocyanate corresponding to the number of hydroxyl groups of the respective alcohol. In this way, several molecules of diisocyanate are linked through urethane groups to the polyhydric alcohol to form high molecular weight polyisocyanates. A particularly suitable product of this kind, DESMODUR ® L (Mobay Corp., Pittsburgh), can be prepared by reacting 3 moles of toluene diisocyanate with 1 mole of 2-ethylglycerol (1,1-bismethylolpropane). Further suitable products are obtained by addition of hexamethylene diisocyanate or isophorone diisocyanate with ethylene glycol or glycerol. Preferred polyisocyanates are diphenylmethane-4,4'-diisocyanate and polymethylene polyphenolisocyanate.

Di- and triisocyanates such as those mentioned above can be employed individually or as mixtures of two or more such isocyanates.

Suitable polyamines within the scope of this invention will be understood as meaning in general those compounds that contain two and more amino groups in the molecule, which amino groups may be linked to aliphatic or aromatic moieties. Examples of suitable aliphatic polyamines are $\alpha,\omega$-diamines of the formula $$H_2N-(CH_2)_n-NH_2$$

wherein n is an integer from 2-6. Exemplary of such diamines are ethylenediamine, propylene-1,3-diamine, tetramethylenediamine, pentamethylenediamine and hexamethylenediamine. A preferred diamine is hexamethylenediamine.

Further suitable aliphatic polyamines are polyethylenimines of the formula $$H_2N-(CH_2-CH_2-NH)_n-H$$

wherein n is an integer from 2 to 5. Representative examples of such polyethylenimines are diethylenetriamine, triethylenetetramine, tetraethylenepentamine and pentaethylenehexamine.

Further suitable aliphatic polyamines are dioxaalkane-$\alpha,\omega$-diamines such as 4,9-dioxadodecane-1,12-diamine of the formula $$H_2N-(CH_2)_3O-(CH_2)_4O-(CH_2)_3-NH_2.$$

Examples of suitable aromatic polyamines are 1,3-phenylenediamine, 2,4- and 2,6-toluenediamine, 4,4'-diaminodiphenylmethane, 1,5-diaminonaphthalene, 1,3,5-triaminobenzene, 2,4,6-triaminotoluene, 1,3,6-triaminonaphthalene, 2,4,4'-triaminodiphenyl ether, 3,4,5-triamino-1,2,4-triazole and 1,4,5,8-tetraaminoanthraquinone. Those polyamines which are insoluble or insufficiently soluble in water may be used as their hydrochloride salts.

Yet further suitable polyamines are those that contain sulfo or carboxyl groups in addition to the amino groups. Examples of such polyamines are 1,4-phenylenediaminesulfonic acid, 4,4'-diaminodiphenyl-2-sulfonic acid, or diaminomonocarboxylic acids such as arnithine and lysine.

Polyamines such as those mentioned above may be used individually or as mixtures of two or more polyamines. They are conveniently added as aqueous solutions.

The shell wall content of the microcapsules, which is determined by amounts of the complementary wall-forming components employed, may vary from about 2.5 to 30% by weight, preferably 5 to 20% by weight, based on the material to be encapsulated.

The amount of each complementary wall-forming component to employ will vary with their equivalent weights. While approximately stoichiometric amounts are preferred, an excess of one component may be employed without departing from the scope of this invention. The total amount of the components required to form the capsule wall in each specific case depends primarily on the wall thickness of the capsules to be prepared and also on the capsule size.

The process of this invention can be carried out at any temperature which is above the melting point of the water-insoluble material (which may contain a solvent to depress its melting point), that is, from below room temperature to a moderately elevated temperature up to the boiling point of the solvent, if one is employed. In practice a suitable temperature range is from 10° to 75° C. It is preferred to carry out the process of this invention in the temperature range from 20° to 45° C. The time needed to complete the reaction of a polyisocyanate with a polyamine to form polyurea microcapsules is normally from 2 to 30 minutes at room temperature. The degree of conversion and the end of the reaction can be determined by titration of the free amine present in the aqueous phase.

The suspensions of microcapsules obtainable in the process of this invention are directly ready for use. However, for transportation and storage they can be stabilized by the addition of further ingredients such as surface-active agents, thickeners, antifoams and antifreeze agents.

It is, however, also possible to separate the microcapsules from the directly obtained suspensions by filtration or centrifugation and either to dry them or convert them once more into a suspension. The microcapsules which have been isolated from the suspension and dried are in the form of a flowable powder that has a virtually unlimited shelf life.

In addition to the previously mentioned advantages of microencapsulated agrochemicals, the microcapsules of the present invention in some instances exhibit decreased crop damage without loss of herbicidal effectiveness.

An additional object of the present invention is a composition comprising an aqueous suspension of microcapsules prepared by the process herein described.

A further object of the invention is a method of regulating plant growth or controlling pests, which comprises applying to a plant or animal locus as desired an effective amount of an agricultural chemical microencapsulated according to the process described above, as plant growth regulator or pest control agent.

The present invention will be further explained by reference to the following examples which are merely illustrative and not limiting in nature.

EXAMPLE 1

Using a Brinkmann Homogenizer and a 250 ml bottle, a solution of 3.48 g of MONDUR MR (Mobay Corp.) in 50 g of metolachlor is dispersed, with high shear stirring, in a solution of 1.08 g of SMA ® Resin 1440H (from Atochem North America, Inc., Suite 300, 5 Great Valley Parkway, Malvern, Pa.) in 49.7 g of water. The high shear stirring is maintained for 1 minute, and thereafter, the shear is reduced with a concurrent addition of 2.15 g of HMDA (hexamethylenediamine in the form of a 70% aqueous solution). Slow stirring is continued for about 30 minutes, during which time 1.07 g of Siponate DSB (diphenyloxide disulfonate solution from Rhone-Poulenc), a suspension aid, is added. The average capsule size is about 5 to 20 microns.

EXAMPLE 2

2.15 g of SMA 1440H is added to 47.6 g of water in a 250 ml bottle. The mixture is gently stirred until the SMA 1440H is completely dissolved. The aqueous solution of SMA 1440H is then used to emulsify a solution of 3.48 g MONDUR MR in 50 g of diazinon under high shear agitation using a Brinkmann Homogenizer. The high shear agitation is maintained for one minute, and thereafter, the shear is reduced with a concurrent addition of 4.3 g of HMDA (in the form of a 35% aqueous solution). The slow agitation is continued for 30 minutes. The average particle size is about 2 to 20 microns.

EXAMPLE 3

30.96 g of propiconazole is first dissolved in 7.74 g of Kemester 9014 (tetradecanoic acid, methyl ester from Witco Co.). 2.7 g of MONDUR MR is then added to the propiconazole solution. The mixture is emulsified in a solution of 3.22 g SMA 1440H in 59.5 g of water under high shear agitation using a Brinkmann Homogenizer. The high shear agitation is maintained for one minute, and thereafter, the shear is reduced with a concurrent addition of 4.3 g of HMDA (in the form of a 35% aqueous solution). The slow agitation is continued for 30 minutes. The average particle size is about 5 to 50 microns.

EXAMPLE 4

The most common result of using an inappropriate surfactant is that the system solidifies immediately and forms some large unusable masses when the second reactive component, such as HMDA, is added to the oil/water emulsion. Morwet DB (DeSoto Chemicals), a sodium salt of dibutyl naphthalene sulfonate, is a surfactant widely used in agricultural formulations. It is, however, not suitable for high concentration microencapsulation. This will be illustrated as follows:

A solution of 3.48 g of Mondur MR in 50 g of metolachlor is emulsified in a solution of 5.38 g of Morwet DB in 45.4 g water under high shear using a Brinkmann Homogenizer. The high shear agitation is maintained for one minute, and thereafter, the shear is reduced with a concurrent addition of 4.23 g of HMDA (in the form of a 46.7% aqueous solution). A cheese-like mass is formed immediately.

EXAMPLE 5

Cotton was planted in a plot size of 4 rows × 50 ft; 40 inches between rows and 2 inches between plants. Three experiments were conducted at three locations in Texas. Profenofos, microencapsulated according to the present invention and isolated in dry powder form, was compared head to head with CURACRON 8E (Ciba-Geigy Corp., Greensboro, N.C., an emulsifiable concentrate formulation of profenofos). The formulations were applied to cotton leaves at a 1 pound A.I. per acre rate by using a John Deere broadcast foliar sprayer. The efficacy of the formulations was evaluated by the percentage of larval control against Spodoptera Frugiperda and Heliothis zea per 50 leaves per plot at one and two weeks after treatment. Visual inspection in terms of cotton leaf injury was also conducted one and two weeks after treatment. The following results indicate that microencapsulated profenofos exhibits less crop injury while maintaining equivalent insect control.

TABLE 1

Efficacy of Profenofos Formulations

| Types | % Larvae Control | |
|---|---|---|
| | Spodoptera Frugiperda | Heliothis zea |
| EC | 100.0 | 85.7 |
| Microencapsulated | 97.8 | 75.0 |

TABLE 2

Cotton Injury of Profenofos Formulations

| Types | % Cotton Injury | | |
|---|---|---|---|
| | I-306 | I-307 | I-308 |
| EC | 7.33 | 3.67 | 1.67 |
| Microencapsulated | 2.00 | 1.00 | 0.67 |

What is claimed is:

1. A process for the preparation of an aqueous suspension of microcapsules having a capsule wall of a solid polymeric substance enclosing a water-immiscible material, which process comprises preparing a solution of a first reactive component required to form said capsule wall in said water-immiscible material, then uniformly dispersing said solution in an aqueous medium which contains, in an effective amount to form an oil-in-water emulsion, a surfactant which is a salt of a partial ester of a styrene-maleic anhydride copolymer, and subsequently adding thereto, with agitation, a second reactive component required to form said capsule wall which is complementary to the first one and reacts with it under the mixing conditions, whereby a solid polymeric wall is formed about the dispersed water-immiscible material.

2. A process according to claim 1, wherein the amount of the salt of a partial ester of a styrene-maleic anhydride copolymer is from 0.5% to 20% by weight relative to that of the water-immiscible material to be encapsulated.

3. A process according to claim 2, wherein the amount of the salt of a partial ester of a styrene-maleic anhydride copolymer is from 1% to 5% by weight relative to that of the water-immiscible material to be encapsulated.

4. A process according to claim 1, wherein the salt of a partial ester of a styrene-maleic anhydride copolymer is selected from the group consisting of salts of alkali metals, alkaline earth metals, ammonia and quaternary ammonium hydroxides.

5. A process according to claim 4, wherein the salt is an ammonium salt.

6. A process according to claim 4, wherein the salt is an ammonium salt or a partial ester of a 1:1 styrene-maleic anhydride copolymer.

7. A process according to claim 1, wherein the reactive components required to form the polymeric capsule wall are employed in the amount of 2.5 to 30% by weight based on the material to be encapsulated.

8. A process according to claim 1, wherein the first reactive component required to form said capsule wall is a polyisocyanate and the second reactive component required to form said capsule wall is a diamine or polyamine, whereby a solid polyurea wall is formed about the dispersed water-immiscible material.

9. A process according to claim 1, wherein the water-immiscible material is an agricultural chemical selected from the group consisting of herbicides, plant growth regulators, insecticides, acaricides, fungicides, nematicides, safeners, ectoparasiticides, and mixtures thereof.

10. A process according to claim 9, wherein the agricultural chemical is selected from the group consisting of metolachlor, profenofos, isazofos, propiconazole and diazinon.

11. A process according to claim 1, wherein the concentration of said water-immiscible material is from 100 to 700 g of microcapsules per liter.

12. A process according to claim 1 for the preparation of an aqueous suspension of microcapsules having a solid capsule wall of polyurea enclosing a water-immiscible agricultural chemical, which comprises dispersing a solution of a polyisocyanate dissolved in said water-immiscible agricultural chemical in an aqueous medium containing an ammonium salt of partial ester of a styrene-maleic anhydride copolymer, and subsequently adding thereto, with agitation, at a temperature between 10° and 75° C., an aqueous polyamine solution, whereby a solid polyurea wall is formed about the dispersed agricultural chemical.

13. A process according to claim 12, wherein the agricultural chemical is selected from the group consisting of metolachlor, profenofos, isazofos, propiconazole and diazinon.

14. A method of regulating plant growth or controlling pests, which comprises applying to a plant or animal locus as desired in effective amount of an agricultural chemical microencapsulated according to a process according to claim 1, as plant growth regulator or pest control agent.

* * * * *